US008861358B2

(12) United States Patent
Croft, Jr. et al.

(10) Patent No.: US 8,861,358 B2
(45) Date of Patent: *Oct. 14, 2014

(54) APPLYING ROUTER QUALITY OF SERVICE ON A CABLE MODEM INTERFACE ON A PER-SERVICE-FLOW BASIS

(75) Inventors: Kenneth J. Croft, Jr., Cary, NC (US); Sriram Haridas, Bangalore (IN); John B. Duffie, III, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/087,174

(22) Filed: Apr. 14, 2011

(65) Prior Publication Data

US 2011/0194411 A1 Aug. 11, 2011

Related U.S. Application Data

(63) Continuation of application No. 11/776,802, filed on Jul. 12, 2007, now Pat. No. 7,948,883.

(51) Int. Cl.
| | |
|---|---|
| *H04L 12/26* | (2006.01) |
| *H04L 12/801* | (2013.01) |
| *H04L 12/931* | (2013.01) |
| *H04L 12/851* | (2013.01) |
| *H04L 12/28* | (2006.01) |

(52) U.S. Cl.
CPC ............ *H04L 47/10* (2013.01); *H04L 49/506* (2013.01); *H04L 47/2441* (2013.01); *H04L 12/2801* (2013.01); *H04L 47/12* (2013.01); *H04L 43/0894* (2013.01)
USPC ............................ 370/235; 370/230; 725/111

(58) Field of Classification Search
USPC ...................... 370/230, 235, 295.21; 725/111
See application file for complete search history.

(56) References Cited

U.S. PATENT DOCUMENTS

| | | | |
|---|---|---|---|
| 6,014,384 A * | 1/2000 | Weberhofer | 370/395.43 |
| 6,515,963 B1 | 2/2003 | Bechtolsheim et al. | |
| 6,546,017 B1 | 4/2003 | Khaunte | |
| 6,553,568 B1 | 4/2003 | Fijolek et al. | |
| 6,718,380 B1 | 4/2004 | Mohaban et al. | |
| 6,950,399 B1 | 9/2005 | Bushmitch et al. | |
| 6,959,332 B1 | 10/2005 | Zavalkovsky et al. | |
| 7,006,438 B2 * | 2/2006 | West et al. | 370/231 |
| 7,012,891 B1 | 3/2006 | Chandran et al. | |
| 7,027,457 B1 * | 4/2006 | Chiussi et al. | 370/414 |
| 7,088,678 B1 | 8/2006 | Freed et al. | |
| 7,092,397 B1 * | 8/2006 | Chandran et al. | 370/395.5 |
| 7,266,080 B1 | 9/2007 | Dispensa et al. | |

(Continued)

Primary Examiner — Rasheed Gidado
(74) Attorney, Agent, or Firm — Novak Druce Connolly Bove + Quigg LLP

(57) ABSTRACT

In one embodiment, a router that accesses a cable network through a cable modem receives, from the cable modem, a plurality of service-flow classifications utilized by the cable modem to describe service flows on the cable network. Based on the received service-flow classifications from the cable modem, the router determines traffic destined for the cable network that corresponds to each service-flow on the cable network. The router receives, from the cable modem, an indication of network backpressure for a particular service-flow on the cable network. The indication of network backpressure is received when a threshold of network backpressure has been surpassed for the particular service-flow on the cable network. The router controls particular traffic that corresponds to the particular service-flow on the cable network based on the indication of network backpressure for the particular service-flow on the cable network.

26 Claims, 6 Drawing Sheets

(56) References Cited

U.S. PATENT DOCUMENTS

| | | |
|---|---|---|
| 7,290,046 B1 | 10/2007 | Kumar |
| 7,336,604 B2 * | 2/2008 | Dong et al. ............ 370/230 |
| 7,400,637 B1 | 7/2008 | Chapman |
| 7,697,429 B2 * | 4/2010 | Godlewski ............ 370/231 |
| 2003/0016628 A1 * | 1/2003 | Kadambi et al. ............ 370/235 |
| 2003/0232547 A1 | 12/2003 | Reiss et al. |
| 2004/0039820 A1 | 2/2004 | Colby et al. |
| 2004/0160963 A1 * | 8/2004 | Dong et al. ............ 370/395.21 |
| 2004/0221032 A1 | 11/2004 | Bernstein et al. |
| 2005/0005021 A1 * | 1/2005 | Grant et al. ............ 709/232 |
| 2006/0025149 A1 | 2/2006 | Karaoguz et al. |
| 2007/0053286 A1 | 3/2007 | Jain et al. |
| 2008/0008210 A1 * | 1/2008 | Godlewski ............ 370/463 |

\* cited by examiner

APPLYING ROUTER QUALITY OF SERVICE ON A CABLE MODEM INTERFACE ON A PER-SERVICE-FLOW BASIS

RELATED APPLICATIONS

This application for United States patent is a continuation of U.S. patent application Ser. No. 11/776,802, filed on Jul. 12, 2007 by Kenneth J. Croft Jr., et al., entitled "Applying Routing Quality of Service on a Cable Modem Interface on a Per-Service-Flow Basis", the contents of which are incorporated by reference herein in their entirety.

TECHNICAL FIELD

The present disclosure relates generally to computer networks, and, more particularly, to integrating routers and cable modems.

BACKGROUND

Computer networks often employ the use of routers to interconnect a plurality of network devices (e.g., client devices, other routers, etc.), and to correspondingly route traffic/data (e.g., packets) between the interconnected network devices, as will be understood by those skilled in the art. Also, routers may be configured to apply certain services to the traffic, such as Quality of Service (QoS) functions that may be used to control the traffic (e.g., to manipulate the traffic in some manner), such as to achieve a desired transmission rate according to one or more desired/required rate limitations (e.g., bandwidth). For instance, a router may operate on different types of traffic, for example, distinguishing between voice and data traffic, such that the router may prioritize and appropriately queue different classes of traffic to provide router QoS.

Also, cable modems may be used to interconnect one or more network devices to a cable network (e.g., a service provider's network), so that the network devices may access other networks, such as the Internet. Cable modems translate traffic between the network devices and the cable network into appropriate transmission formats. Cable modems typically operate on service-flows, which may be defined by particular parameters/classifications as will be understood by those skilled in the art, such that traffic may be assigned to a particular service flow by the cable modem, and transmitted to the cable network accordingly. In other words, the cable network may provide backpressure (e.g., a congestion detection/indication) to the cable modem that is specific to a particular service-flow, and the cable modem may then be configured to apply QoS to that particular service flow to reduce congestion on the cable network.

In certain network configurations, a router (and all the network devices supported by the router) may be interconnected to a cable modem via an external interface (i.e., as separate devices), such as an Ethernet interface. Since the Ethernet interface generally has an available bandwidth that is significantly higher than the cable network bandwidth, the router is restricted in its ability to natively enforce an effective QoS policy. In particular, in order to keep from overflowing the cable modem and/or cable network, the router would need to control (e.g., shape) traffic over the Ethernet interface to a finite value/rate that is equal to a minimum guaranteed aggregate rate of the cable network. The fundamental problem with this approach is that the cable network bandwidth can often exceed the minimum guaranteed rate, such as where other members of the cable network are not fully utilizing the available bandwidth, as will be understood by those skilled in the art. The router, therefore, would not be fully utilizing all of the available bandwidth.

Furthermore, the router generally multiplexes the received traffic from its interconnected network devices onto the external Ethernet interface on a first-come first-go basis, regardless of whether the traffic would belong to a particular service-flow at the cable modem, particularly because the router is unaware of the service-flow parameters/classifications. This multiplexing of traffic ignores service-flow differentiation and defeats the use of any existing per-interface flow control methods for the purpose of providing per service-flow backpressure, such as "PAUSE" frames (an Ethernet-based request by the cable modem for the router to temporarily stop sending all traffic on the interface). Accordingly, the router is generally forced to control/restrict an aggregate rate of all service-flows (i.e., all traffic sent from the router to the cable modem) simultaneously, thus preventing the router from taking advantage of all available bandwidth, such as where one service flow is more congested than another service flow. There remains a need, therefore, for a technique that applies router QoS on a cable modem interface on a per-service-flow basis.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a cable modem determines network backpressure per service-flow, and transmits the network backpressure per service-flow to a router (e.g., co-located on a same network device). Also, the cable modem may transmit service-flow classifications to the router, such that the router may then control traffic per service-flow based on the network backpressure per service-flow, accordingly.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Figure 1:
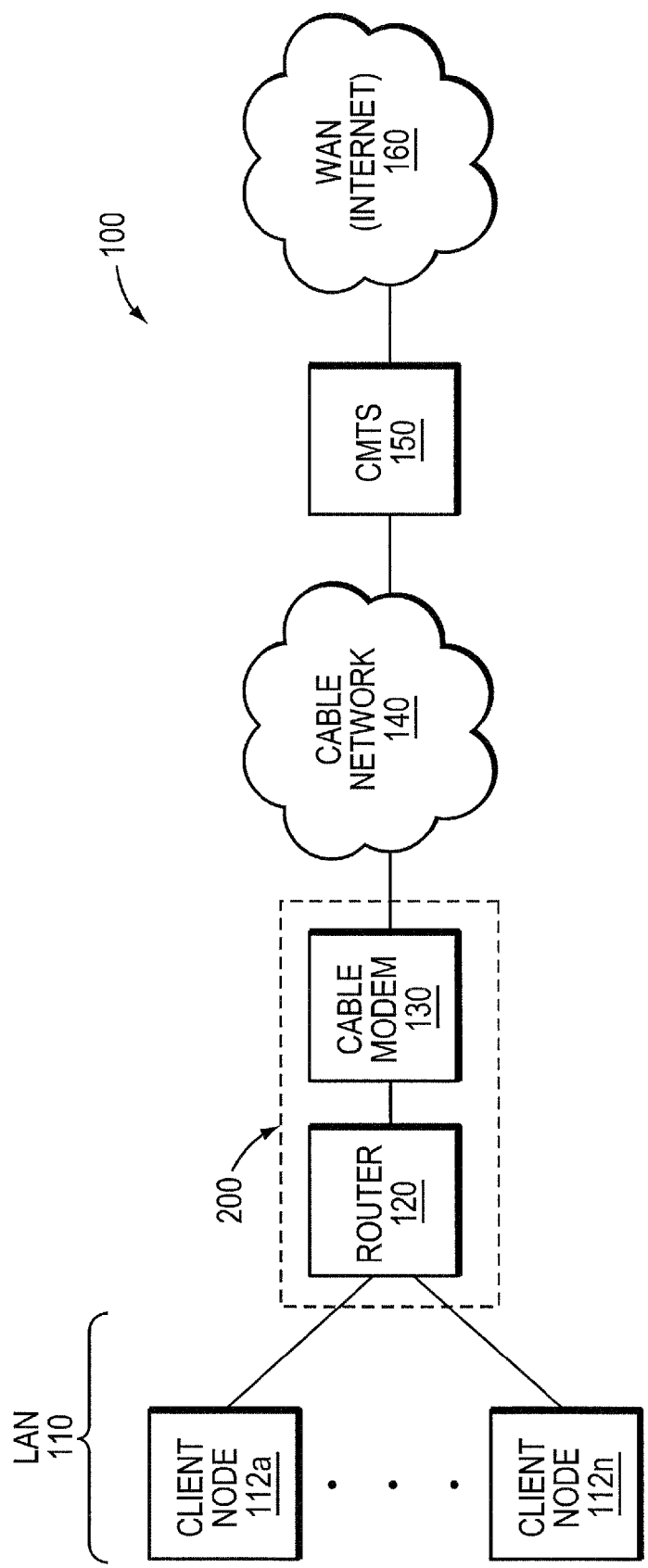
FIG. 1 illustrates an example computer network.

FIG. 1 is a schematic block diagram of an example computer network 100 illustratively comprising nodes/devices interconnected by links as shown. Illustratively, one or more client/user nodes 112 (e.g., 112a-112n) may be interconnected with a router 120, e.g., to form a LAN 110. Router 120 is interconnected with a cable modem 130, and as described herein, may be embodied as a single network device 200 (dashed lines). The cable modem 130 provides access for the router (and other devices of LAN 110) to a cable network 140 (e.g., a service provider's cable network), which terminates at a cable modem termination system (CMTS) 150. The CMTS may provide access to a WAN (e.g., the Internet) 160, accordingly, thus completing an example network 100 for interconnecting client nodes 112 to the Internet 160 via a cable network 140. Those skilled in the art will understand that any number of nodes, devices, links, etc. may be used in the computer network, and that the view shown herein is for simplicity. Those skilled in the art will also understand that while the embodiments disclosed herein are described in terms of one particular example arrangement/configuration of routers 120 and cable modems 130, the embodiments may apply to any network configuration that may utilize routers and cable modems.

Data packets may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, cable network protocols, etc.

Figure 2:
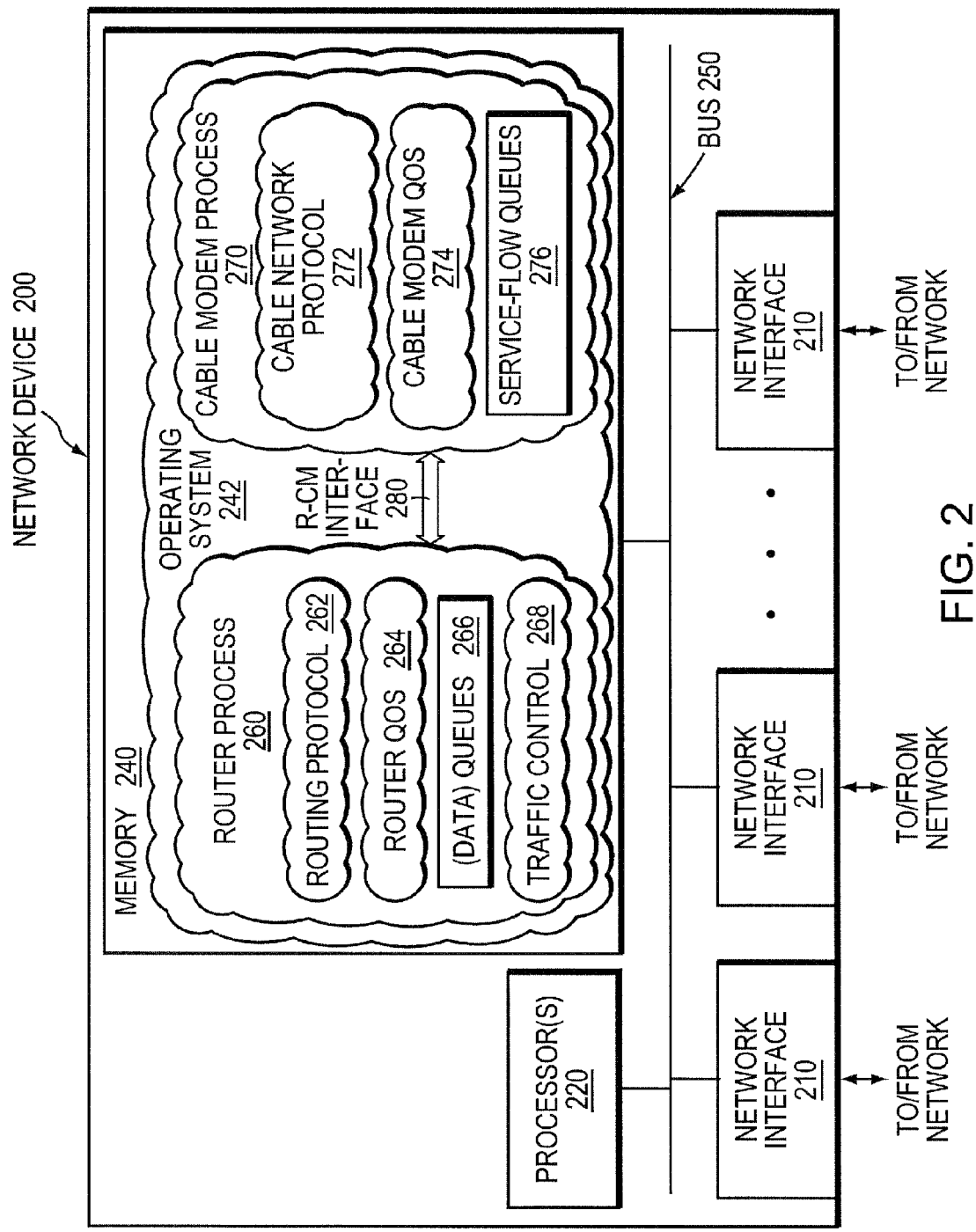
FIG. 2 illustrates an example network device.

FIG. 2 is a schematic block diagram of an example network device 200 that may be advantageously used with one or more embodiments described herein, e.g., as a router 120 and a cable modem 130 (e.g., as a single device). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), cable network protocols, etc.

The memory 240 comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures, such as data/traffic queues 266 and service-flow queues 276. An operating system 242, portions of which are typically resident in memory 240 and executed by the processor(s), functionally organizes the node by, inter alia, invoking network operations in support of software processes and/or services executing on the device. Notably, in accordance with one or more embodiments described herein, the operating system 242 may comprise a router operating system (or "router process") 260 and a cable modem operating system (or "cable modem process") 270, which each functionally organize the device to operate respectively in accordance with a router and a cable modem. For instance, router operating system 260 may comprise software processes and/or services such as routing protocol services 262, router Quality of Service (QoS) process 264, and traffic control process 268. Also, cable modem operating system 270 may comprise software processes and/or services such as cable network protocol services 272 and cable modem QoS process 274. Notably, the router process 260 and the cable modem process 270 of the device 200 may communicate via a known message-passing mechanism, such as the Inter Process Communication (IPC) mechanism, which is illustratively embodied as a "router-cable-modem" or "R-CM" interface 280, as described herein. It will be apparent to those skilled in the art that other processor and memory means, including various computer-readable media, may be used to store and execute program instructions pertaining to the inventive technique described herein.

Routing process (operating system) 260 may be operable to provide router and routing functions for traffic received from clients/users 112 on LAN 110, as well as from cable modem 130 (process 270) from the cable network 140. Routing process 260 receives the traffic and routes/forwards the traffic (based on one or more configured policies) toward a desired destination. For instance, routing protocol services 262 may contain computer executable instructions executed by processor(s) 220 to perform functions provided by one or more routing protocols, such as the Interior Gateway Protocol (IGP), the Border Gateway Protocol (BGP), static routing, etc., as will be understood by those skilled in the art. These functions may be configured to manage a routing/forwarding information database (not shown) containing, e.g., data used to make routing/forwarding decisions.

Also, router QoS process 264 may contain computer executable instructions executed by processor(s) 220 to perform functions related to the treatment/management of the data/traffic in accordance with router QoS. In particular, router QoS may be based on one or more local policies that define a particular treatment to be applied to particular types/classes of data/traffic. For example, as data/traffic is received at the router process/operating system 260, the traffic may be placed into queues 266 (e.g., for a particular exit interface 210) for forwarding the traffic out that interface in due course, as will be understood by those skilled in the art. Before entering the queues 266, or while within the queues, router QoS process 264 may apply local router QoS policies to the traffic, is such as prioritizing certain traffic and otherwise controlling the traffic in a configurable manner. For instance, traffic control process 268 may contain computer executable instructions executed by processor(s) 220 to perform functions in conjunction with router QoS process to control traffic at the router as appropriate (e.g., as configured and/or as required by router QoS). Notably, traffic controlling (e.g., for QoS), generally, may comprise, e.g., dropping traffic, reordering traffic, marking traffic, queuing traffic (in a particular manner and/or in particular queues 266), shaping traffic, etc., as may be appreciated by those skilled in the art. In particular, traffic may be controlled (e.g., according to one or more embodiments described herein) to provide QoS functionality comprising, for example: supporting dedicated bandwidth, improving loss characteristics, avoiding and managing network congestion, shaping network traffic, setting traffic priorities across the network, etc.

Cable modem process (operating system) 270 may be operable to provide cable modem functions for traffic received from router (process) 120(260), as well as from cable network 140. Cable modem process 270 receives the traffic and converts the traffic into a transmission medium/format suitable for the network onto which the traffic may be forwarded from the cable modem. For instance, cable network protocol services 272 may contain computer executable instructions executed by processor(s) 220 to perform functions provided by one or more cable network protocols, such as in accordance with the known Data Over Cable Service Interface Specification (DOCSIS®) (e.g., version 2.0). For example, the DOCSIS standard outlines a technique to enforce cable modem QoS using policies that are "pushed down" to the cable modem. The service provider of the cable network 140 defines these policies and then uses the CMTS 150 to push down the policies to the cable modem. These policies comprise both the criteria that define service-flows and the properties (e.g., allocated bandwidth) for each service-flow. Illustratively, DOCSIS 2.0 defines up to sixteen types of service-flows having different parameters (classifications/characteristics), such as max burst, bandwidth, throughput, latency, jitter, etc., as will be appreciated by those skilled in the art.

Cable modem QoS process 274 may contain computer executable instructions is executed by processor(s) 220 to perform functions related to the treatment/management of the data/traffic in accordance with cable modem QoS. In particular, cable modem QoS may be based on one or more cable network policies that define a particular treatment to be applied to particular service-flows. For example, as data/traffic is received at the cable modem process/operating system 270 from router 260, the traffic may be placed into service-flow queues 276 (e.g., for a particular service-flow) for forwarding the traffic onto the cable network 140, as will be understood by those skilled in the art. In this manner, the cable modem may be configured to handle each service-flow in a different way. For example, voice traffic, which generally has higher constraints of jitter and delay, may be classified within a particular service-flow suitable for voice calls, and may be treated differently (e.g., queued separately) from data traffic, which generally has less constraints. As such, if data traffic is congested at the cable modem or within the cable network 140, voice traffic service-flows may still be afforded a necessary amount of available bandwidth on the network.

In operation, the cable modem (process) 270 receives traffic from the router (process) 260 and transmits the traffic onto the cable network 140. (Conversely, the cable modem also receives traffic from the cable network 140, and may transmit that traffic to the router, accordingly.) Conventionally, the router 120/260 and cable modem 130/270 are not the same network device, and are interconnected with an external link, such as Ethernet. In accordance with one or more embodiments of the disclosure, however, the router and cable modem may be co-located on the same network device 200, and may be interconnected with an R-CM interface 280 (e.g., a messaging protocol used with the IPC mechanism) as described herein. As mentioned above, the cable modem may transmit the received traffic from the router onto the cable network at a fixed rate or at a variable rate, e.g., based on network backpressure from network 140 or more particularly from CMTS 150, as will be understood by those skilled in the art.

Figure 3:
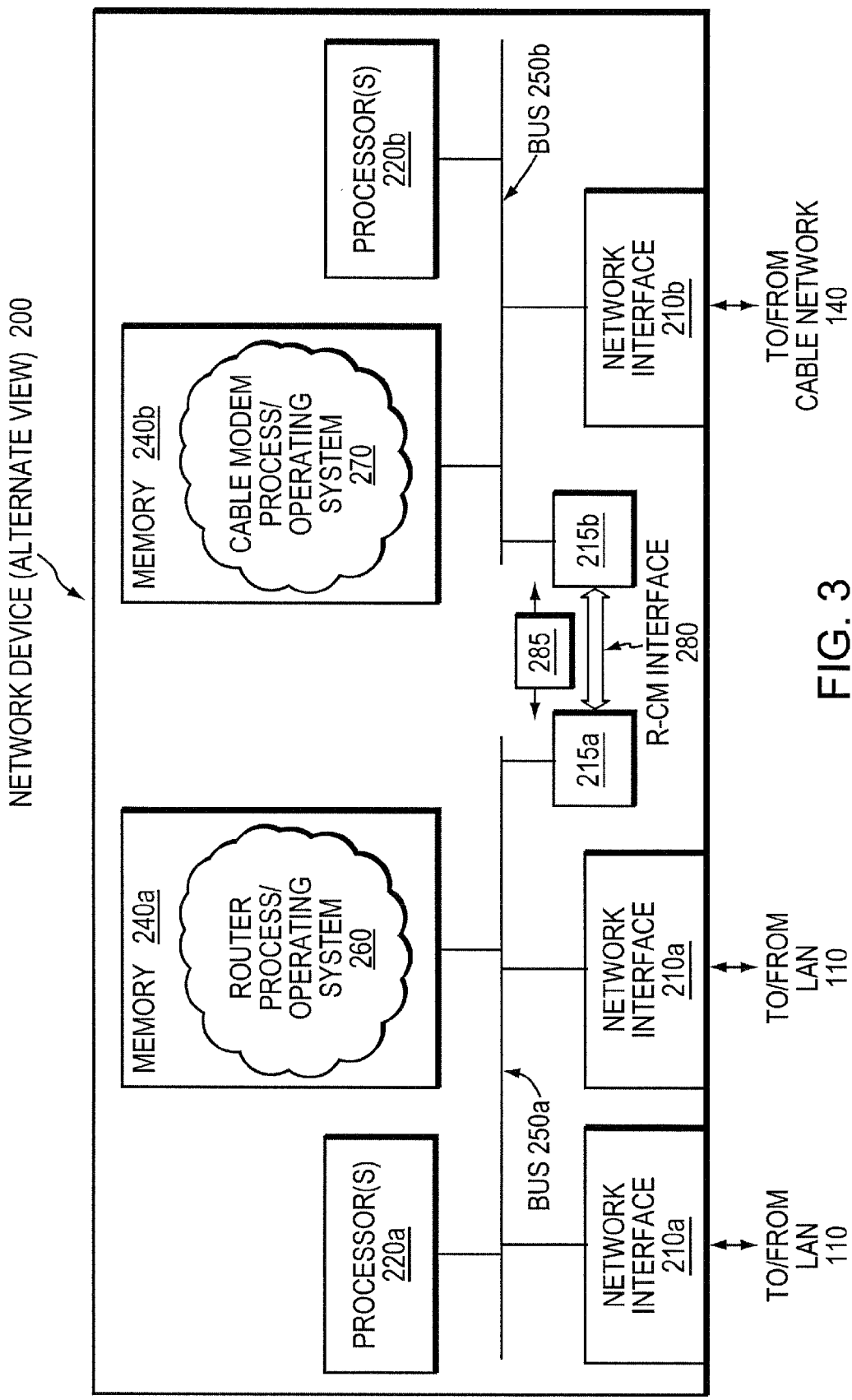
FIG. 3 illustrates an alternative view of the example network device.

FIG. 3 illustrates an alternative view of the example network device 200 in accordance with one or more embodiments described herein. For instance, the router process 260 and cable modem process 270 may be organized internally as separately functioning devices contained within the same network device platform. For instance, one portion of the device 200 may be dedicated to providing router services, such as a processor 220*a*, one or more network interfaces 210*a* (communicating with LAN 110), and a memory 240*a* comprising router operating system 260 interconnected by a bus 250*a*. Another portion of the device 200 may be dedicated to providing cable modem services, such as a processor 220*b*, at least one network interface 210*b* (communicating with cable network 140), and a memory 240*b* comprising cable modem operating system 270 interconnected by a bus 250*b*. To provide communication between the two portions of the device, an internal link, such as an Ethernet link, is illustratively embodied as R-CM interface 280 to interconnect the respective buses 250 at access points 215*a* and 215*b*, respectively (or, for example, the R-CM interface 280 may be a portion of the bus 250 bridging portions 250*a* and 250*b*, i.e., without specific access points). Notably, while the router and cable modem are shown in FIG. 3 as having separately distinct resources (e.g., processors, memory, etc.), those skilled in the art may appreciate that certain resources may be shared by the router and cable modem, and that the alternate view shown herein is merely an example.

As noted, a problem associated with the operation of routers and cable modems is that the cable network bandwidth is often variable (e.g., exceeding a minimum guaranteed rate), and the router generally has no way of knowing what is the current available bandwidth. In particular, because the router is unaware of service-flows as utilized by the cable modem, the router is conventionally unable to distinguish between service-flows, and thus is unable to apply router QoS on a per-service-flow basis. As such, even if the router were aware of the variable available bandwidth of the cable modem/network, the router would conventionally not be able to apply router QoS to particular service-flows (which, notably, may have different available bandwidths), and would thus be unable to apply effective QoS applicable for the cable network.

Applying Router QoS on a Cable Modem Interface on a Per-Service-Flow Basis

According to embodiments of the disclosure, a cable modem determines network backpressure per service-flow, and transmits the network backpressure per service-flow to a router (e.g., co-located on a same network device). Also, the cable modem may transmit service-flow classifications to the router, such that the router may then control traffic per service-flow based on the network backpressure per service-flow, accordingly.

In an illustrative embodiment, router process (operating system) 260 and cable modem process (operating system) 270 of the network device 200 are integrated onto a single network device 200, and/or may be interconnected by an R-CM interface 280 to perform functions related to the novel techniques described herein, e.g., to apply router QoS on a cable modem interface on a per-service-flow basis. In particular, the interface 280 may be internal to operating system 242 (e.g., IPC), internal as a physical connection (e.g., Ethernet) between portions of device (e.g., access points 215), external as a physical connection between two devices, or external as a physical connection out from the device 200 and back into the device 200, etc.

Operationally, the cable modem 270 may transmit service-flow classifications to the router 260, such as over the R-CM interface 280. In particular, the router benefits from the ability to distinguish which packets are destined for a particular upstream service-flow at the cable modem. Accordingly, the cable modem may provide this information by supporting control plane messages that indicate service-flow parameters including any corresponding packet filtering information. That is, with packet filters, which indicate particular characteristics (e.g., source/destination addresses of packets of a particular flow), the router can distinguish which packets are destined for a particular service-flow. With service-flow parameters, the router may determine to which service-flow an unfiltered packet will most likely be assigned by the cable modem. As such, the router may correlate service-flows of the cable modem with particular classes of data/traffic (such as voice and data flows) of the router, creating a mapping between data types/classes of the router with service-flows of the cable modem (the use of which is described herein).

Figure 4:
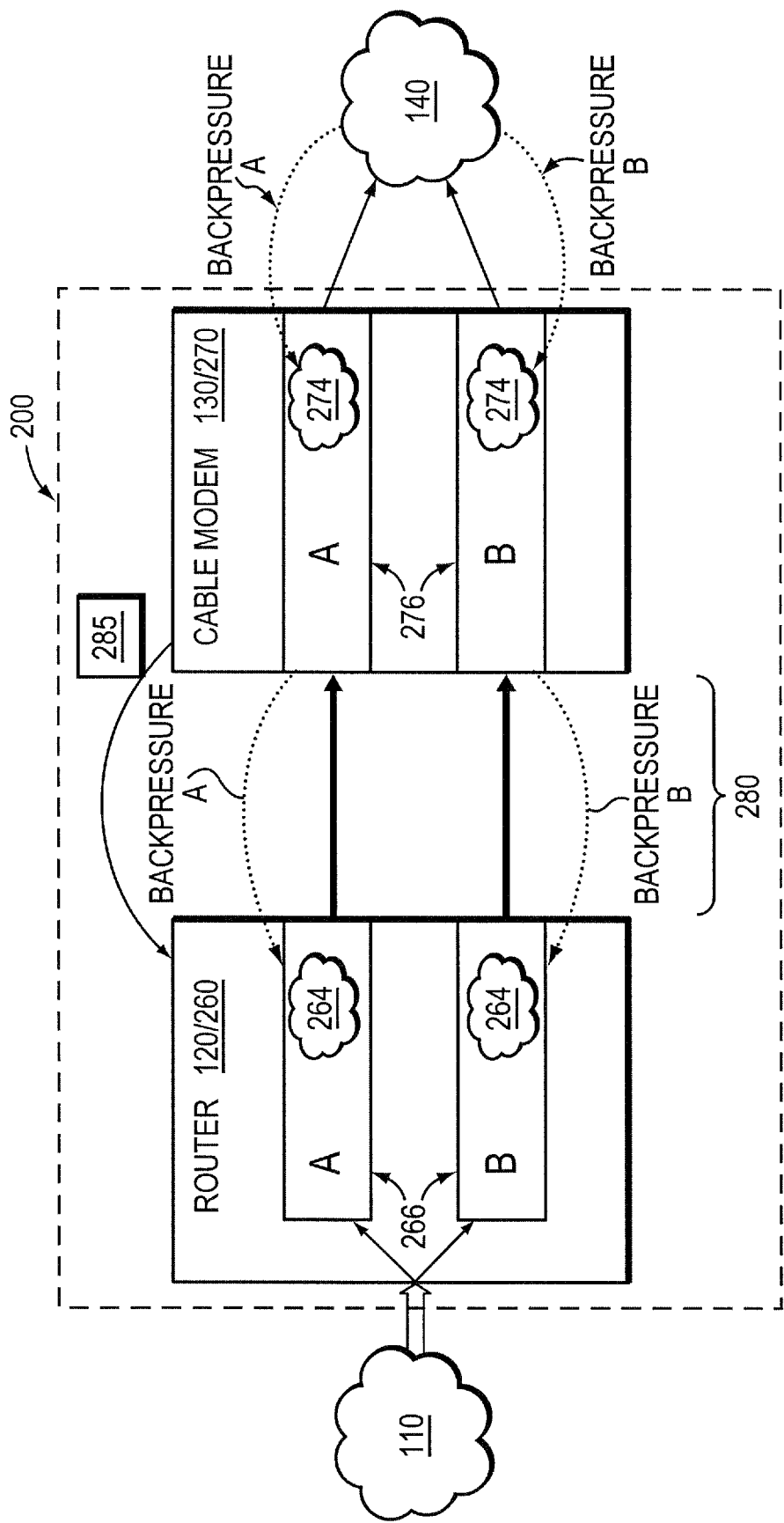
FIG. 4 illustrates an example view of router and cable modem functionality in accordance with one or more embodiments described herein.

FIG. 4 illustrates an example view of router and cable modem functionality in accordance with one or more embodiments described herein. For instance, once the router 260 is aware of the service-flow classifications/parameters, any data/traffic received at the router from the LAN 110 may be divided/classified into appropriate service-flows. For example, two illustrative service-flow-oriented data queues 266 are shown, corresponding to service-flows A and B. These service-flows on the router 260 correspond to service-flows A and B on the cable modem 270. The cable modem also has service-flow queues 276 for service-flows A and B, accordingly, which may be transmitted (downstream) toward the cable network 140 (e.g., ultimately to Internet 160) on a per-service-flow basis.

In accordance with one or more embodiments described herein, the cable modem 270 may determine network backpressure per service-flow, such as from feedback from the CMTS 150, or from queues/buffers 276 and associated thresholds (water-marks). For instance, assume that service-flow A is congested on the cable network 140. As such, the CMTS 150 may send a notification to cable modems 130/270 that service-flow is congested. Alternatively, cable modem 270 may determine that service-flow A is congested due to the fact that a corresponding service-flow queue 276 has surpassed a configurable threshold of network backpressure. In particular, the threshold may be passed because the queue is emptying slowly (e.g., cable network backpressure and/or cable modem queue rate), or because the router 120/260 is sending service-flow A traffic at too high a rate for the cable modem to sufficiently handle.

Upon determining network backpressure per service-flow (which, notably, implies either determining that the backpressure surpasses a threshold, or determining an actual amount of network backpressure), the cable modem 130/270 may transmit the network backpressure to the router 120/260. In other words, the transmission of backpressure may be flow control signals that are indications from the cable modem 270 to the router 260 to indicate that a given service-flow is (or is becoming) congested. When the cable modem has queued more than a high number of bytes described by the high water-mark to a particular upstream service-flow (e.g., service-flow A), the cable modem indicates to the router that the particular service-flow is congested.

In particular, the network backpressure may be transmitted to the router over the R-CM interface 280, which may comprise a hardware indication/message 285 (e.g., electronic '1' or '0' values), or a signaling message 285 of an exchange protocol between the cable modem and the router. In this manner, the R-CM interface 280 not only carries service-flow parameter/classification information as described above, but may also carry the network backpressure indications for each upstream service-flow, accordingly. Notably, in this sense, the R-CM interface 280 may comprise IPC messages and/or out-of-band signaling, such as for non-Ethernet interfaces (e.g., hardware '1' and '0' transmission lines) in addition to the Ethernet interface adapted to transmit/carry traffic/data between the router and the cable modem (i.e., there are multiple connections/links represented by interface 280, accordingly). Also, the transmission of network backpressure may be an "on" or "off" transmission, e.g., indicating that there is or is not congestion for a particular service flow, or may be an indication of actual amounts/values, e.g., a percentage/amount of available service-flow queue space/bytes, a graduated indication of congestion (e.g., slightly loaded, moderately loaded, very loaded, overloaded, etc.). Accordingly, the messages 285 over the R-CM interface 280 may be adequately configured (e.g., as a proprietary protocol or otherwise) to convey the appropriate information as configured for the cable-modem and/or router.

Also in accordance with one or more embodiments described herein, the router 270 may control traffic on a per-service-flow basis based on the network backpressure per service-flow. Specifically, by determining which particular data/traffic at the router corresponds to which particular service-flow of the cable modem (e.g., and based on applied packet filters), the router may apply router QoS to the appropriate service-flow (that is, to the data/traffic corresponding to the appropriate service-flow). In other words, the router uses these congestion indications (cable modem backpressure) to provide feedback into its own queuing operations, so that router QoS functionality may be applied to these queuing operations (e.g., functionality as mentioned above). For example, if service-flow A is congested, then the backpressure (over interface 280) to the router 260 may result in controlling data/traffic corresponding to service-flow A, accordingly. As noted, traffic controlling, generally, may comprise, e.g., dropping traffic, reordering traffic, marking traffic, queuing traffic, shaping traffic, etc., as may be appreciated by those skilled in the art. (Moreover, note that without the techniques described herein, a generic backpressure indication, such as a PAUSE frame, would have conventionally caused the router to cease transmission of all traffic to the cable modem, such that both service flows A and B would have suffered.) Further, if the notification of backpressure provides an actual amount of backpressure as mentioned above, then the router may be configured to provide QoS specifically tailored for the amount of backpressure, such as determining how to deal with the possible/approaching congestion of one or more particular service-flows.

In addition to applying router QoS on a per-service-flow basis, the router 260 may also divide service-flows into sub-flows for better differentiation. For instance, if the cable network defines a certain set of service-flows, the router may apply additional parameters to the flows for greater granularity when applying router QoS. For example, if one particular service-flow corresponds to, e.g., voice traffic parameters, then the router may be able to divide the "voice" service-flow into sub-flows for other parameters, such as prioritizing certain clients' voice calls over other clients' calls, etc. In this manner, the router and cable modem combination may perform more granularly and more effectively than the two devices separately.

Once the backpressure is relieved, that is, upon reaching a reduced network backpressure for a particular service-flow (e.g., A) that is below a configurable threshold (a low water-mark), the cable modem 270 may either cease transmission of the network backpressure for the particular service-flow, or may indicate to the router 260 that the service-flow is no longer congested. In response, the router 260 may correspondingly cease traffic controlling for that particular service-flow. Accordingly, then, the combination of per service-flow backpressure indications and service-flow classifier parameters provides the router with the information it needs to apply router QoS on a per-service-flow basis.

Figure 5:
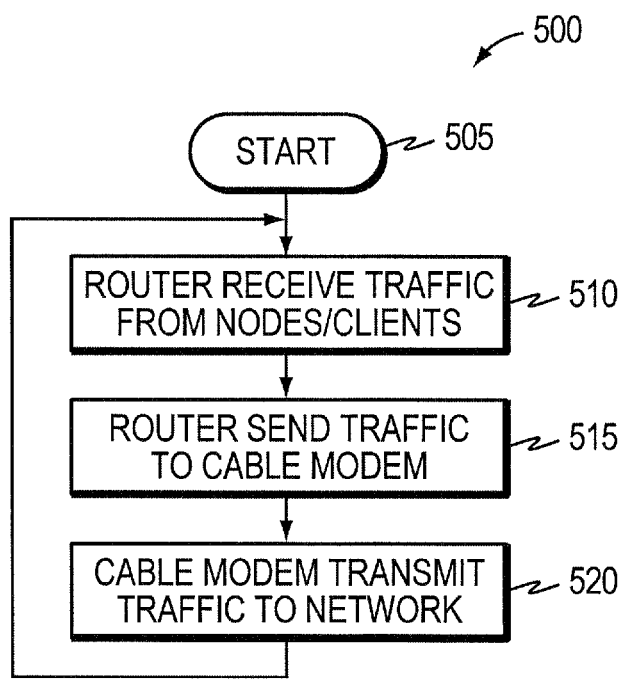
FIG. 5 illustrates an example procedure for traffic communication from a router to a cable modem.

FIG. 5 illustrates an example procedure for traffic communication from a router to a cable modem. In particular, FIG. 5 represents the communication of traffic from the is router 120/260 to the cable modem 130/270 during the procedure 600 of FIG. 6 below. The procedure 500 starts at step 505, and continues to step 510, where the router 120/260 receives traffic (e.g., data) from nodes/clients 112 of LAN 110. This traffic may then be sent/forwarded from the router to the cable modem 130/270 in step 515, such as over the R-CM interface 280 (e.g., internally or externally). As mentioned herein, the traffic over the R-CM interface 280 may be sent in terms of service-flows as utilized/indicated by the cable modem, accordingly. The cable modem receives the traffic (e.g., now as service-flows), and transmits the traffic to the cable network 140 in step 520. The procedure 500 returns/continues to step 510 where the router receives more traffic from the LAN 110.

Figure 6:
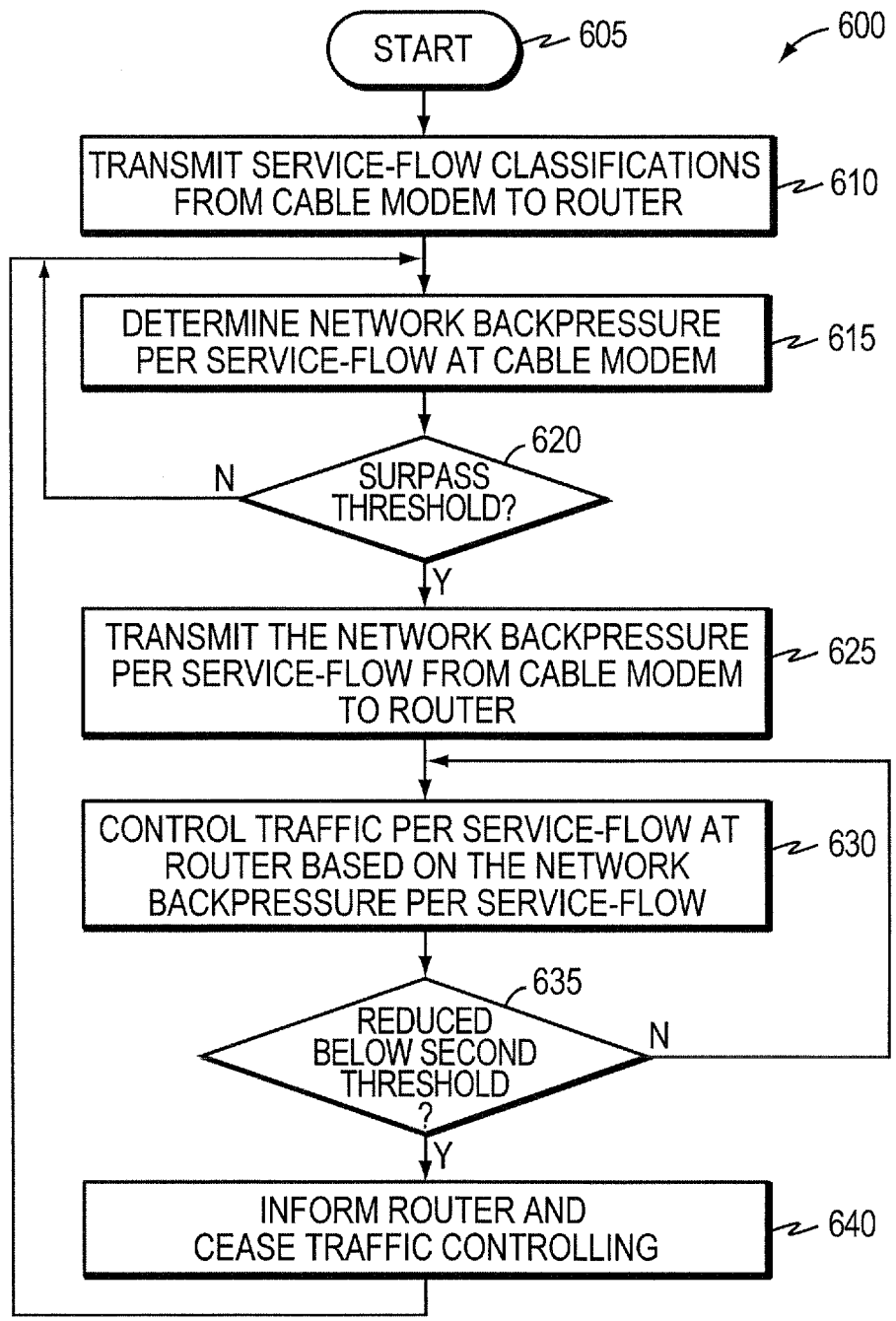
FIG. 6 illustrates an example procedure for applying router QoS on a cable modem interface on a per-service-flow basis in accordance with one or more embodiments described herein.

FIG. 6 illustrates an example procedure for applying router QoS on a cable modem interface on a per-service-flow basis in accordance with one or more embodiments described herein. (As noted, procedures 500 of FIG. 5 and 600 of FIG. 6 may partially overlap in operation on the device 200.) The procedure 600 starts at step 605, and continues to step 610, where the cable modem 130/270 may transmit service-flow classification to the router 120/260 as described above, such as over the R-CM interface 280. In step 615, the cable modem may determine network backpressure from the cable network 140 on a per-service-flow basis. If the backpressure remains below a configurable threshold in step 620 (that is, for a particular service-flow), then the procedure returns to step 615 to monitor the backpressure. If, however, the backpressure surpasses the threshold in step 620, then the cable modem may transmit the determined network backpressure per service-flow to the router in step 625, for example, as a hardware signal or signaling message over R-CM interface 280 as described above.

During its operation, the router 120/260 may control the traffic per service-flow in step 630 based on the received backpressure per service-flow from the cable modem 130/270, accordingly. For instance, if the backpressure remains above the second threshold (e.g., to prevent oscillations, as mentioned above) in step 635, then the procedure may return to step 630, such that the router continues to control traffic until instructed otherwise by the cable modem. (Alternatively, the procedure 600 may return to step 625 where the cable modem re-determines and continually transmits the backpressure to the is router.) If the backpressure is reduced below the second threshold in step 635, then the router is informed in step 640, traffic controlling at the router (that is, for this particular service-flow and for this particular reason) is ceased, and the procedure returns to step 615 for the cable modem to monitor/determine the backflow, accordingly.

Advantageously, the novel techniques described herein apply router QoS on a cable modem interface on a per-service-flow basis in a computer network. By effectively integrating a router and a cable modem as described above (e.g., internally and/or externally), the novel techniques provide a router with the ability to apply router QoS (e.g., in addition to cable modem QoS) to prioritize traffic according to local rules and service-flows, and to also divide service-flows into sub-flows for improved differentiation. In particular, the techniques described above allow a router to utilize substantially all of the bandwidth available to the cable modem, as determined by the backpressure from the cable modem and cable network. Also, the dynamic aspects of one or more embodiments described herein alleviate the need for cumbersome and inefficient manual configuration, and allow for real-time adjustments of router QoS and traffic controlling, accordingly.

While there have been shown and described illustrative embodiments that apply router QoS on a cable modem interface on a per-service-flow basis in a computer network, it is to be understood that various other adaptations and modifications may be made within the spirit and scope of the present invention. For example, the embodiments have been shown and described herein in accordance with particular conventional protocols (e.g., DOCSIS). However, the embodiments of the invention in their broader sense are not so limited, and may, in fact, be used with other protocols that may be adapted for use in accordance with one or more embodiments described herein (e.g., having particularly-defined service-flows, etc.). Also, while the above description has been directed to cable modems and cable networks, other suitable network devices and networks may advantageously utilize the techniques described above, such as Digital Subscriber Line (DSL) modems and DSL networks.

The foregoing description has been directed to specific embodiments of this invention. It will be apparent, however, that other variations and modifications may be is made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   receiving from a cable modem, at a router that accesses a cable network through the cable modem, a plurality of service-flow classifications utilized by the cable modem to describe service flows on the cable network;
   based on the received service-flow classifications from the cable modem, determining traffic at the router destined for the cable network that corresponds to each service-flow on the cable network;
   receiving, from the cable modem at the router, an indication of network backpressure for a particular service-flow on the cable network, the indication of network backpressure received when a threshold of network backpressure has been surpassed for the particular service-flow on the cable network; and
   controlling particular traffic at the router that corresponds to the particular service-flow on the cable network, based on the indication of network backpressure for the particular service-flow on the cable network.

2. The method of claim 1, further comprising:
   receiving, from the cable modem at the router, an indication that network backpressure has diminished for the particular service-flow on the cable network; and ceasing controlling particular traffic at the router that corresponds to the particular service-flow on the cable network, based on the indication that network backpressure has diminished for the particular service-flow on the cable network.

3. The method of claim 1, wherein the controlling comprises:
dropping the particular traffic at the router that corresponds to the particular service-flow on the cable network, while continuing to forward other traffic destined for the cable network to the cable modem.

4. The method of claim 1, further comprising:
associating the traffic at the router that corresponds to each service-flow on the cable network with a respective data queue at the router.

5. The method of claim 4, wherein the controlling comprises:
queuing in the respective data queue the particular traffic at the router that corresponds to the particular service-flow on the cable network, while continuing to forward other traffic destined for the cable network to the cable modem.

6. The method of claim 1, wherein the network backpressure for the particular service-flow is determined from feedback from a cable modem termination system (CMTS) provided to the cable modem.

7. The method of claim 1, wherein the network backpressure for the particular service-flow is determined from a service-flow queue at the cable modem, that corresponds to the particular service-flow, surpassing a threshold.

8. The method of claim 1, wherein the cable modem and the router are portions of a single network device.

9. The method of claim 8, wherein the receiving an indication of network backpressure for a particular service-flow on the cable network occurs over a router-cable-modem (R-CM) interface.

10. The method of claim 9, wherein the R-CM interface comprises Inter Process Communication (IPC) messages.

11. The method of claim 1, wherein the service-flow classifications are Data Over Cable Service Interface Specification (DOCSIS) service-flow classifications.

12. The method of claim 1, wherein the service-flow classifications describe a plurality of service flows each having different parameters, wherein the parameters include max burst, bandwidth, throughput, latency or jitter.

13. A network device, comprising:
one or more network interfaces configured to communicate traffic with a local area network (LAN);
a processor coupled to the network interfaces and configured to execute one or more processes; and
a memory configured to store a router process executable by the processor, the router process when executed operable to
receive a plurality of service-flow classifications utilized to describe service flows on a cable network,
based on the received service-flow classifications, determine traffic destined for the cable network that corresponds to each service-flow on the cable network,
receive an indication of network backpressure for a particular service-flow on the cable network, the indication of network backpressure received when a threshold of network backpressure has been surpassed for the particular service-flow on the cable network, and
control particular traffic that corresponds to the particular service flow on the cable network, based on the indication of network backpressure for the particular service-flow on the cable network.

14. The network device of claim 13, wherein the memory is further configured to store a cable modem process executable by the processor, the cable modem process when executed operable to
transmit the plurality of service-flow classifications utilized to describe service flows on the cable network to the router process,
determine the network backpressure for the particular service-flow on the cable network, and
transmit the indication of network backpressure for the particular service-flow on the cable network to the router process when the threshold of network backpressure has been surpassed for the particular service-flow on the cable network.

15. The network device of claim 13, wherein the router process when executed is further operable to
drop the particular traffic that corresponds to the particular service-flow on the cable network.

16. The network device of claim 13, wherein the router process when executed is further operable to
receive an indication that network backpressure has diminished for the particular service-flow on the cable network, and
cease to control particular traffic that corresponds to the particular service-flow on the cable network, based on the indication that network backpressure has diminished for the particular service-flow on the cable network.

17. The network device of claim 13, wherein the network backpressure for the particular service-flow is determined from feedback from a cable modem termination system (CMTS).

18. The network device of claim 13, wherein the network backpressure for the particular service-flow is determined from a service-flow queue that corresponds to the particular service-flow surpassing a threshold.

19. The network device of claim 13, wherein the service-flow classifications are Data Over Cable Service Interface Specification (DOCSIS) service-flow classifications.

20. An apparatus that accesses a cable network through a cable modem, comprising:
means for receiving from the cable modem a plurality of service-flow classifications utilized by the cable modem to describe service flows on the cable network;
means for determining traffic destined for the cable network that corresponds to each service-flow on the cable network, based on the received service-flow classifications from the cable modem;
means for receiving, from the cable modem, an indication of network backpressure for a particular service-flow on the cable network, the indication of network backpressure received when a threshold of network backpressure has been surpassed for the particular service-flow on the cable network; and
means for controlling particular traffic that corresponds to the particular service-flow on the cable network based on the indication of network backpressure for the particular service-flow on the cable network.

21. A method comprising:
receiving from a cable modem, at a network device that accesses a cable network through the cable modem, one or more service-flow classifications utilized by the cable modem to describe one or more service flows on the cable network;
based on the one or more service-flow classifications, determining traffic at the network device destined for the cable network that corresponds to each service-flow on the cable network;

receiving, at the network device from the cable modem an indication of network backpressure for a particular service-flow on the cable network, the indication of network backpressure received when a threshold has been surpassed for the particular service-flow on the cable network; and controlling particular traffic at the network device that corresponds to the particular service-flow on the cable network, based on the indication of network backpressure for the particular service-flow on the cable network.

22. The method of claim 21, further comprising:

receiving, at the network device, an indication that the network backpressure has diminished for the particular service-flow; and ceasing controlling the particular traffic.

23. The method of claim 21, wherein the controlling comprises:

dropping the particular traffic that corresponds to the particular service flow, while continuing to forward other traffic destined for the cable network.

24. The method of claim 21, further comprising:

associating the traffic that corresponds to the one or more service-flows on the cable network with one or more respective data queues at the network device.

25. The method of claim 24, wherein the controlling comprises:

queuing the particular traffic in the data queue that corresponds to the particular service-flow, while continuing to forward other traffic destined for the cable network.

26. An apparatus configured to access a cable network through a cable modem, comprising:

at least one processor;

a non-transitory memory medium storing machine executable instructions which, when executed by the processor, cause the apparatus to:

receive a plurality of service-flow classifications utilized by the cable modem to describe service flows on the cable network;

identify traffic destined for the cable network that corresponds to each service-flow on the cable network, the traffic identified by the received service-flow classifications from the cable modem;

receive an indication of network backpressure for a particular service-flow on the cable network, the indication received when a threshold of network backpressure has been surpassed for the particular service-flow on the cable network; and control traffic corresponding to the particular service-flow on the cable network based on the indication of network backpressure.

* * * * *